United States Patent [19]

Scheibner et al.

[11] Patent Number: 4,676,851
[45] Date of Patent: Jun. 30, 1987

[54] PROCESS AND APPARATUS FOR FORMING INTEGRAL INTERLOCKING CLOSURE FILM STOCK

[75] Inventors: Gerald H. Scheibner, Downers Grove, Ill.; Robert T. Dorsey, Chicago; James D. Engle, Darien; William E. Henderson, deceased, late of Hinsdale, all of Ill., by Ann A. Henderson, Heir

[73] Assignee: First Brands Corporation, Danbury, Conn.

[21] Appl. No.: 831,117

[22] Filed: Feb. 20, 1986

Related U.S. Application Data

[63] Continuation of Ser. No. 602,636, Apr. 25, 1984, abandoned, which is a continuation-in-part of Ser. No. 567,389, Dec. 30, 1983, abandoned.

[51] Int. Cl.$^4$ .............................................. B29C 47/88
[52] U.S. Cl. .......................................... 156/66; 156/91; 156/244.11; 156/244.24; 156/244.25; 156/244.26; 156/498; 156/500; 383/63
[58] Field of Search ............... 156/244.11, 244.26, 156/91, 66, 244.24, 498, 500, 244.25; 383/63, 65

[56] References Cited

U.S. PATENT DOCUMENTS

| | | | |
|---|---|---|---|
| 3,462,332 | 8/1969 | Goto | 156/244.24 |
| 4,212,337 | 7/1980 | Kamp | 383/63 |
| 4,259,133 | 3/1981 | Yagi | 156/91 |
| 4,263,079 | 4/1981 | Sutrina et al. | 156/91 |
| 4,306,924 | 12/1981 | Kamp | 156/91 |
| 4,363,345 | 12/1982 | Scheibner | 383/65 X |
| 4,428,788 | 1/1984 | Kamp | 156/244.11 |

*Primary Examiner*—Caleb Weston
*Attorney, Agent, or Firm*—Gary L. Wamer

[57] ABSTRACT

A process and apparatus for producing integral interlocking closure film stock useful in making reclosable containers by extruding a film of molten thermoplastic material onto a casting roll, extruding closure elements to contact and join said film at a point between about one inch and about five inches prior to the tangency line of the film on the periphery of the casting roll, partially cooling the closure elements with liquid coolant starting anywhere within the region between the closure element extrusion exits, and the tangency line of a film of molten thermoplastic material and the periphery of the casting roll, and further cooling the closure elements by directing them past additional cooling assemblies. Stripping means are employed to remove liquid coolant from the cooled integral interlocking closure film stock material produced.

37 Claims, 4 Drawing Figures

PROCESS AND APPARATUS FOR FORMING INTEGRAL INTERLOCKING CLOSURE FILM STOCK

This application is a continuation of prior U.S. application Ser. No. 602,636, filed Apr. 25, 1984, now abandoned which is a continuation-in-part of application Ser. No. 567,389, filed Dec. 30, 1983, now abandoned.

This invention relates to plastic containers having an interlocking closure fastening device, and more particularly, to a process and apparatus for making stock material to be used in the production of interlocking closure bag articles.

DESCRIPTION OF THE PRIOR ART

Plastic containers which feature reclosable fasteners are generally well known and widely used by consumers and in industry. Their popular use has provided a strong incentive for the development of improved manufacturing equipment and methods for more economical operations, as well as products having more appeal in the marketplace.

One particularly desirable type of reclosable fastener is disclosed in U.S. Pat. No. 4,212,337 to Kamp wherein the closure fastening device comprises a first channel element including a base portion, a pair of spaced apart webs extending from the base portion, and hook portions extending from each of the webs and facing away from each other. A second channel element includes a base portion, a pair of spaced apart webs extending from the base portion, and hook portions extending from each of the webs and facing towards each other. The channel elements interlock by pressing the first channel element into the second channel element so that the hook portions engage each other. This closure fastening device is attached in the area of the container opening to form a container capable of being closed and opened.

Generally, the plastic container stock is made from a film of polyethylene, polypropylene, nylon or other thermoplastic material which is manufactured by extrusion. Each closure element of the fastening device can be manufactured as a strip for subsequent attachment to the film by the use of appropriate means. For example, a thermoelectric device can be used to apply heat to a film in contact with a closure strip to cause a transfer of heat through the film to produce fusing at the interface of the film and the closure strip. The fusing of the film and the closure strip may also be established by the use of hot melt adhesives, hot air sealing, or other methods such as ultrasonic heating. However, hot air sealing of closure strips to a film requires a sizable inside closure flange to seal to the film. This extra material in the closure strips contributes little to functionality of the container and increases its cost. Further, the resulting hot air seals do not cover the entire flange of each closure strip thereby making the flanges noticeably visible and giving the reclosable container an added-on appearance.

To avoid the aforementioned detractions, it has been proposed to adhere the closure fastening device integral with the film as disclosed in U.S. Pat. No. 4,306,924. It is taught therein that the production of a plastic film connected to a pair of occludable closure strips may be provided by feeding a supply of pre-formed closure strips onto a casting cylinder and extruding a molten plastic film onto the casting cylinder with the closure strips so that the plastic film, before cooling, becomes fused to the flange portions of the closure strips. The casting cylinder is provided with a pair of spaced-apart circumferential grooves so that the respective profile portions of the closure strips extend therein. During casting of the molten plastic film, urging means are employed for pressing the plastic film against the flange portions of the closure strips. The molten slot cast film is susceptible to being thinned out in the area directly adjacent to the lamination thereby giving rise to weak areas along the closure strip flange edges.

Thus, it would be desirable to avoid the aforementioned disadvantages with the prior art, reduce overall capital equipment expenditures by eliminating the need for separate closure strip production lines, and also production plant floor space requirements. Such would also reduce operating expenses by eliminating labor costs associated with closure strip production lines, lower raw material costs by avoiding closure strip production line waste products, and eliminate closure strip inventory requiring warehouse storage facilities. Further, the male and female closure halves would be subjected to less mechanical working.

It has further been proposed to avoid the aforementioned disadvantages with the prior art, as disclosed in U.S. Pat. No. 4,263,079, by forming an integral thermoplastic fastening means on a cast thermoplastic film. It is therein disclosed that an integral closure means is provided by extruding fastener elements angularly disposed towards a cast film, joining the fastener elements and the film, and cooling the fastener elements and the film upon a chill roll. However, the joining of the fastener elements and the film must occur at a point closer to the film die lips than to the chill roll, and in order to obtain satisfactory adhesion between the fastener elements and the film, the edge of the profile die plate must be located below and toward the film surface with respect to the exit of the film die. Water jets are aligned with the fastener elements to cool them, and a second water jet may be located on the opposite side of the chill roll for further cooling of the fasteners.

The apparatus for practicing the aforementioned method is claimed in U.S. Pat. Nos. 4,295,919 and 4,358,334. It is therein recited that the apparatus comprises a film extrusion die having an extrusion channel ending in die lips which present a surface defining a plane, and wherein a side of the die presents a face angularly disposed towards the extrusion channel and the die lips. A fastener extrusion due block is located adjacent the aforementioned film die face with a fastener extrusion die plate secured thereto. The fastener die plate has a leading edge located out of the plane of the film die lips. The fastener die block has an extrusion channel disposed angularly adjacent its exit to increase the acuteness of the angularity of the extrudate issuing from the die plate with respect to the extrudate issuing from the film die lips. Cooling means are located below the extrusion die and die plate. The apparatus includes cooling means that cause water to impinge upon the joined fastening means and film, means for passing the joined combination around a roller wherein the part of the roller receiving the combination being the combination receiving side, and the part of the roller from which the combination leaves being the combination take-away side, an air jet apparatus having a nozzle located closely adjacent the take-away side of the roller, and a tongue extending from the air jet apparatus beyond the nozzle to direct air from the nozzle along the joined combination to remove excess water therefrom.

However, it would be desirable to provide a method and apparatus for forming integral interlocking closure and film stock material wherein the fastener element extrusion die block need not be secured to the film die in a fixed position so that placement of a fastener element extrudate onto a film could be more readily modified. In addition, a fastener die block having an extrusion channel disposed angularly to increase the acuteness of the angularity of the extrudate with respect to the extrudate issuing from the film die lips may cause deformation of the fastener means or the film when they contact each other. Further deformation of the integral interlocking closure stock may occur wherein a chill roll is located so that one of its lateral extents to the die plate side of the die lips, thereby angularly disposing the extrudate from the film die lips toward the extrudate issuing from the fastener die plate.

Thus, there is a continuing need for a method and apparatus to provide integral interlocking closure film stock material which overcomes the above-noted problems.

SUMMARY OF THE INVENTION

In accordance with this invention, generally speaking, there is provided a method of forming integral interlocking closure film stock material comprising feeding a supply of molten thermoplastic material to a slot extrusion die, extruding said molten thermoplastic material from said slot extrusion die onto the periphery of a casting roll to form a film of said thermoplastic material, feeding a supply of molten thermoplastic material to interlocking closure profile dies, extruding said molten thermoplastic material from said profile dies so that the formed interlocking closure elements immediately contact and adhere to said film of thermoplastic material to form an integral closure web at a location between about one to five inches prior to the tangency point of said web with the periphery of said casting roll, partially cooling said closure elements by directing a primary controlled flow of liquid coolant onto the surface of said closure elements to stabilize the shape of the closure elements, impinging a flow of gaseous coolant on the film portion of said web at approximately the tangency point of said web and the periphery of said casting roll, and further cooling said closure elements by feeding secondary controlled streams of liquid coolant directly onto said closure elements. Positioned downstream from the location of the secondary liquid coolant streams are liquid coolant stripping means comprising one or more liquid coolant suction nozzles and air nozzles to remove water from the integral interlocking closure stock material. The integral interlocking closure stock material is then passed over a chill roll, slit, passed through a nip, and thereafter folded by one or more folding devices.

In another embodiment of this invention, there is provided an apparatus for producing integral interlocking closure film stock material comprising a film slot cast extrusion die, a plurality of closure profile dies positioned downstream of said film extrusion die exit and arranged so that the molten thermoplastic material from said profile dies exits between about one inch and about five inches after the exit point of the molten thermoplastic material from said film extrusion die, a casting roll positioned downstream of said film extrusion die exit and said profile dies to receive and cool a film of molten thermoplastic material exiting from said film extrusion die at a distance between about three inches and about eight inches after the exit of said film slot extrusion die and at a distance between about one inch and about five inches after the exits of said closure profile dies. Primary cooling nozzles for partially cooling and closure elements are positioned such that coolant first contacts the closure elements anywhere within the region between the exits of closure profile dies 13 and the tangency of the web and the casting roll surface. The primary cooling nozzles direct a controlled flow of liquid coolant such as water onto the surface of the molten closure elements. In this mode, the primary cooling nozzles initiate cooling of the closure elements before or just at the tangency point of the fused closure elements and slot cast film on the periphery of the casting roll. An air knife is positioned opposite from and facing the casting roll, at about the tangency point of the slot cast film and the periphery of the casting roll, to impinge gaseous coolant such as air on the film. The air knife is employed to improve cooling of the slot cast film as the film travels with the rotating casting roll. Downstream from the air knife are secondary cooling nozzle assemblies to effect further cooling of the closure elements. The areas about the exits of the secondary cooling nozzles are confined to provide a region through which the profile portion of each of the closure elements can travel without damage. Each of the cooling nozzles is provided with a controlled supply of liquid coolant such as water. Interspersed with the secondary cooling nozzles, in the direction of web travel, are suction segments which serve to withdraw some of the spent liquid coolant to improve the cooling efficiency in the areas around the closure elements. Downstream from the secondary cooling nozzle assemblies are one or more liquid coolant suction nozzles, and downstream therefrom are positioned one or more air nozzles. The one or more liquid coolant suction nozzles are located close to the one or more air nozzles to minimize "fan-out" of the liquid coolant as it is removed from the area around the cooled closure elements. One or more chill rolls, also positioned downstream of the air knife, serve to provide further cooling of the integral interlocking closure stock material. Just prior to passing over the last chill roll, which may form a nip with another roll, the web may be slit, as with edge trim. After leaving the last chill roll, the web(s) is folded by a folding device(s) and then occluded prior to being processed further.

DETAILED DESCRIPTION OF THE INVENTION

Figure 1:
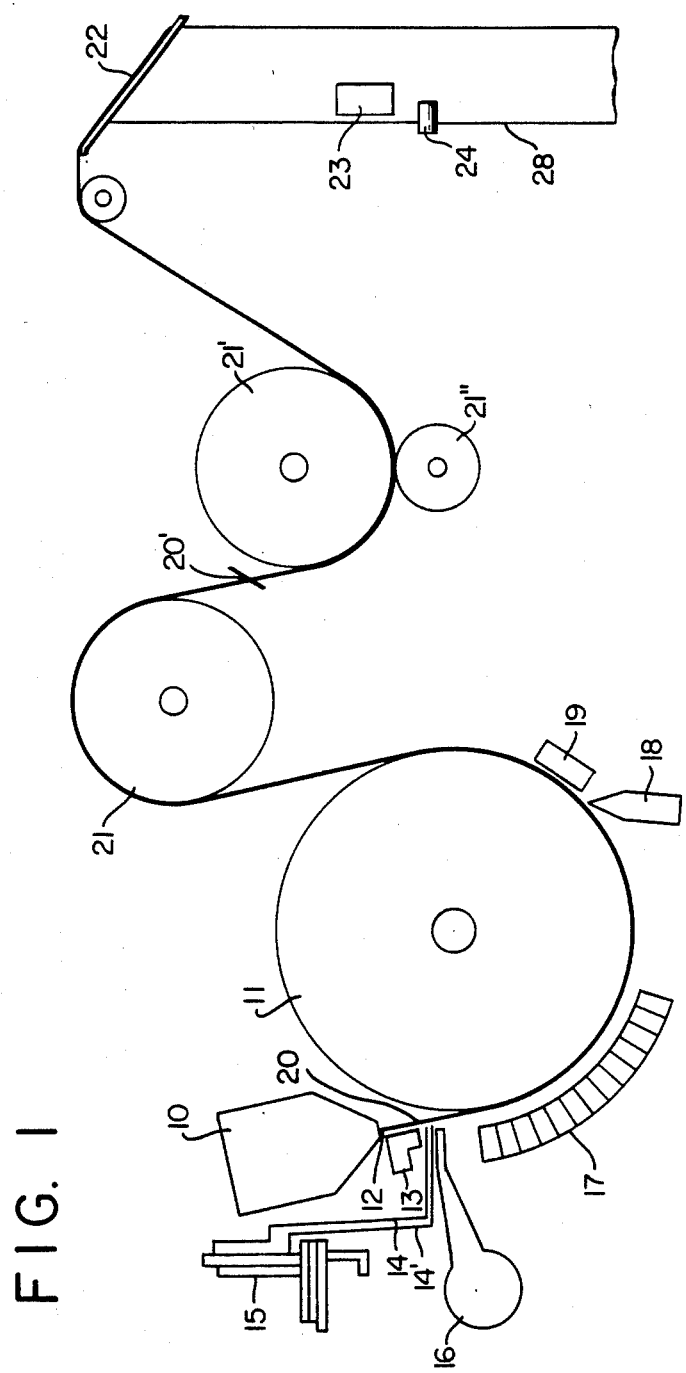
FIG. 1 is a schematic elevational view depicting an equipment arrangement for integrally forming closure elements on film or sheet in accordance with this invention.

In greater detail, integral interlocking closure film stock material is provided in accordance with this invention by feeding a supply of molten thermoplastic material from a conventional screw extruder (not shown) to a slot extrusion die 10 generally illustrated in FIG. 1. Slot extrusion die 10 has a generally elongated opening extending parallel with, and spaced from, the periphery of a casting cylinder 11, wherein slot extrusion die 10 is capable of casting a film or sheet 12 of molten thermoplastic material on the periphery of rotatable casting cylinder 11. Casting cylinder 11 is provided with means (not shown) for rotating the casting cylinder at a controlled rate of rotation. A plurality of closure element profile dies 13 (one shown) are fed a supply of molten thermoplastic material from a conventional screw extruder (not shown). As each formed closure element exits from profile dies 13, it swells in an amount sufficient to contact and adhere to film 12 exiting from slot extrusion die 10. After contact of the formed closure elements with film 12, and adhesion therewith, the closure elements are partially cooled by directing a controlled flow of liquid coolant such as liquid nitrogen, chilled brine, or water onto the surfaces thereof from primary cooling nozzles 14 and 14' (only two of which are shown). Partial cooling of the closure elements serves to stabilize their shape. It has been found that if the shape of the closure elements is not stabilized properly, the closure elements will continue to be drawn-down excessively and thus altered. The formed closure elements may exit from profile dies 13 at any desired transverse location onto film 12, but preferably, the profile dies 13 are positioned so that the formed closure elements contact film 12 near the outermost lateral portions of film 12. In any event, the formed closure elements are in spaced parallel relation to each other on film 12. In operation, primary cooling nozzles 14 and 14' are precisely positioned by attachment to positioners 15 (one shown) so as not to damage the molten closure elements. As shown in FIG. 1, and in greater detail in FIG. 2, the primary cooling nozzles 14 and 14' (only two are shown for clarity), the positioners 15 (one shown in FIG. 1), and the closure element profile dies 13 (one shown) are actually mounted (not shown) from a part of slot extrusion die 10 for accurate placement in accordance with the foregoing requirements. The primary cooling nozzles 14 and 14', the positioners 15, and the profile dies 13 can all be easily repositioned at other lateral positions on die 10. Downstream from primary cooling nozzles 14 and 14' is positioned an air knife 16 opposite to casting cylinder 11 for impinging gaseous coolant such as air on integral closure web 20 at about the tangency line of integral closure web 20 on the periphery of casting cylinder 11. Air knife 16 is used to improve cooling of the film portion of integral closure web 20 as it travels with rotating casting cylinder 11. The direction of the gaseous coolant stream from air knife 16 is controlled such as to prevent flutter of integral closure web 20 which may adversely affect adhesion of the molten closure elements to film 12. In this regard, the direction of the gaseous coolant stream from air knife 16 may be at an angle of between about 5 degrees and about 60 degrees, but is preferably at an angle of about 30 degrees, downward from the horizontal plane. Another consideration in employing air knife 16 is the selective internal or external blockage or diversion of gaseous coolant flow away from the partially cooled closure elements to avoid deformation thereof. In addition, integral closure web 20 edge constraining means (not shown) are preferably used in combination with air knife 16 to stabilize the flatwidth of integral closure web 20, and hence the relative positions of the closure elements at lateral points on integral closure web 20.

Further cooling of the closure elements is provided by passing the closure elements through a secondary cooling nozzle assembly (one shown) 17 located at each closure element position. Secondary cooling nozzle assembly 17 is configured to enable travel of each of the closure elements through a coolant confining region, as shown in greater detail in FIG. 4. Each portion of the secondary cooling nozzle assembly 17 is constructed such that each portion is fed a controlled supply of liquid coolant such as liquid nitrogen, chilled brine, or water which exits from one or more openings therein to contact and cool the closure elements and closely adjacent film. As shown in FIG. 1, each secondary cooling nozzle assembly 17 extends around about 15 percent to about 25 percent of the periphery of casting cylinder 11. Positioned downstream from cooling nozzle assembly 17 are liquid coolant stripping means comprising one or more liquid coolant suction nozzles 18 (one shown), and one or more air nozzles 19 (one shown) to remove liquid coolant from the formed integral closure web 20. The liquid coolant stripping means are positioned near each closure element prior to the transfer point of integral closure web 20 from casting cylinder 11 to further cooling rolls. As indicated, the dried integral closure web is then passed to and over chill rolls 21 and 21'. The web may be slit by slitters 20' mounted just prior to a nip created by rolls 21' and 21", and thereafter passed to a folding device 22 such as an "A-frame" folder, and then to an occlusion guide 23 and occlusion rollers 24 (one shown) thus forming integral interlocking closure film stock 28.

Figure 2:
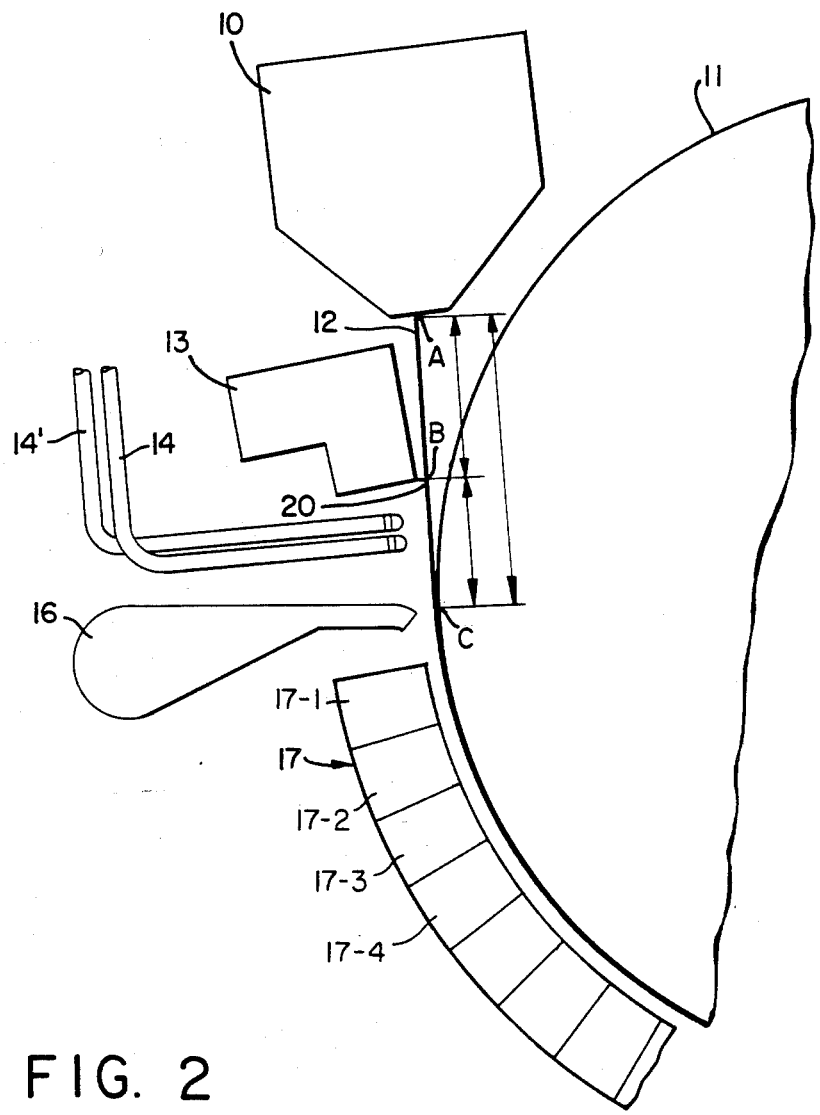
FIG. 2 is an enlarged close-up schematic elevational view of the film slot die, a profile die, some of the primary closure cooling nozzles, the air knife, a secondary cooling nozzle assembly, and their approximate relationship with respect to each other and the casting roll as depicted as part of the equipment arrangement illustrated in FIG. 1.

FIG. 2 illustrates in greater detail the extrusion and cooling arrangement of the present invention discussed with respect to FIG. 1. In FIG. 2, film 12 may be seen exiting from slot extrusion die 10 at the film die orifice generally designated as location A. Located downstream from the exit of slot die 10 and generally equidistant from the exit of slot die 10 and the tangency line (location C) of integral closure web 20 on the periphery of casting cylinder 11, are a plurality of closure element profile dies 13 (one shown) from which the formed closure elements exit at the closure die orifices. This location is generally designated as location B, where the extruded closure elements contact and join with film 12. The distance between location A and location B, that is, the distance between the exit of slot extrusion die 10 and the exits of closure element profile dies 13 may be between about one inch and about five inches, and preferably is between about three inches and about three and one-half inches. Immediately upon exiting from profile dies 13, the formed molten closure elements contact film 12 and travel as integral closure web 20 toward casting roll 11. The closure element portions of integral closure web 20 are partially cooled by primary cooling nozzles 14 and 14' (only two shown) which are positioned such that coolant first contacts the closure elements anywhere within the region between the exits of closure profile dies 13 and the tangency of the web and the casting roll surface. The coolant can be a controlled flow of liquid nitrogen, chilled brine or water directed onto the surface of the formed molten closure elements. The primary cooling nozzles 14 and 14' initiate cooling of the closure elements before, or just at the point the integral closure web 20 reaches located C which is the tangency line of integral closure web 20 on casting roll 11. The distance between location B and location C, that is, the distance from the exit of profile dies 13 and the casting roll periphery tangency line, may be between about one inch and about five inches, preferably between about one and one-half inches and about two and one-half inches. Likewise, the distance between location A and location C, that is, the distance between the exit of slot extrusion die 10 and the casting roll periphery tangency line, may be between about three inches and about eight inches, preferably between about four and three-quarter inches and about five and one-half inches. In accordance with this invention, forced cooling of the formed molten closure elements begins anywhere within the region between the exits of closure profile dies 13 and the tangency of the web and the casting roll surface.

In a preferred mode, primary cooling nozzles 14 and 14' are supplied with liquid coolant which has been degassed to avoid the formation of irregular closure elements which result from non-uniform liquid coolant flowing from the primary cooling nozzle exits when the entrained gas bubbles exit, such as with non-deaerated cooling water. In addition, primary nozzles which initially impinge the cooling liquid coolant more directly onto the closures and less directly onto the adjacent film have been found to result in a more stable shaping of the extruded closure elements during the cooling process. A secondary cooling nozzle assembly 17 mentioned earlier is shown in FIG. 2 as being a sequence of portions depicted as 17-1, 17-2, 17-3, 17-4, etc.

Figure 3:
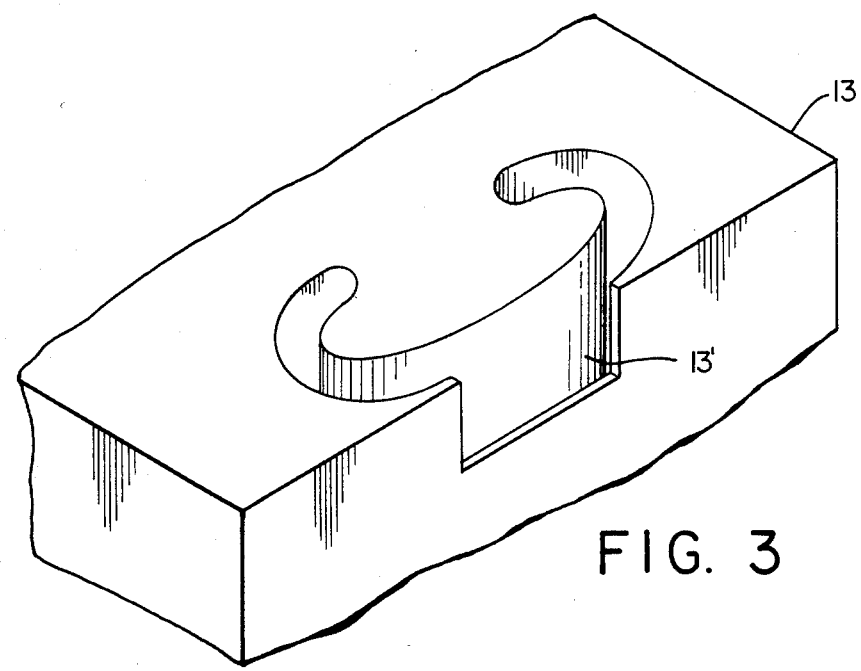
FIG. 3 is a greatly enlarged perspective view of the exit face of one of the closure profile dies depicting an adhesion slot.

FIG. 3 is a greatly enlarged perspective view of the exit face of one of the closure profile dies 13 which is specially machined with an adhesion slot 13' to facilitate fusion of a formed molten closure element to molten film 12 (not shown). The function of adhesion slot 13' is to merge a closure element melt stream with the film or sheet melt stream and provide a seam-free adhesion of the two melt streams while retaining a relatively distortion-free closure element profile shape.

Since adhesion occurs at the base portion of the closure element, and at a point after the slot film die exit, the web, hook and base portions of the profile element suffer little or no distortion. This arrangement also allows the rate of drawdown of the respective extruded closure elements and cast film to be substantially different without suffering distortion of the closure elements.

Figure 4:
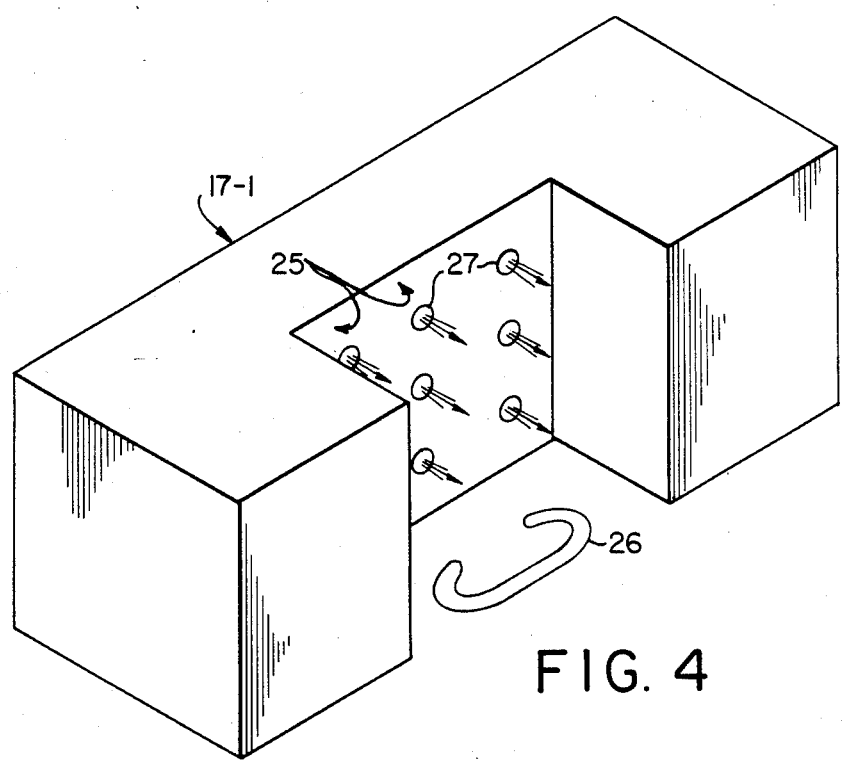
FIG. 4 is a greatly enlarged perspective view of one portion of the secondary cooling nozzle assembly illustrating a confining channel therein and one or more openings for directing liquid coolant at one of the closure elements and adjacent areas.

FIG. 4 is a greatly enlarged perspective view of one of the secondary cooling nozzle portions which is identified as 17-1 for purposes of illustration. As shown therein, portion 17-1 is provided with a coolant confining region 25 to accommodate passage therethrough of the profile portion 26 (shown schematically) of one of the closure elements. It can also be seen that confining region 25 is provided with one or more openings 27 for passage of liquid coolant therethrough in the direction of the arrows, that is, in the general direction of profile portion 26. The multiple secondary cooling nozzle portions feed a controlled stream of liquid coolant such as water to the profile portion, and the nozzle portions are configured such that the profile portion travels in a region in which the liquid coolant also flows. The secondary cooling nozzle assembly also has suction portions which serve to withdraw some of the spent liquid coolant and improve closure cooling efficiency. It should be noted that the extruded closure elements are relatively thicker and contain more mass of thermoplastic material than the cast film, and thus require substantially more cooling. Further, the curved configuration of the closure elements makes them more susceptible to distortion during cooling which could be aggravated by stretching in the cooling region and/or by being drawn around a cooling drum. The multiple secondary cooling nozzle portions of this invention enable rapid cooling of the closure elements and reduce the time during which distortion may occur, thereby providing higher production rates. In a preferred embodiment, the secondary cooling nozzle assembly is configured such that the coolant confining region therein has a shape suited to surrounding the configuration of the closure element.

Various alternatives may also be practiced pursuant to the instant invention. For example, each closure element, or various parts of the closure elements, such as the hook portions, the web portions, the base portion, or a flange portion, and the sheet or film may each be produced from totally different thermoplastic materials thus providing unique characteristics to the integral interlocking closure film stock material and the final container products, such as a pliable closure on a strong, stiff container body. Likewise, different colors may be imparted to the container body and the various parts of the closure elements. In addition, the thermoplastic material employed for the closure elements may contain various additives such as slip agents to provide unique characteristics to the final product such as a reclosable container. The film extrusion die and the closure profile dies may or may not be supplied from the same source of molten thermoplastic material. In this regard, the amount of molten thermoplastic material supplied to each profile die and the film die should be accurately controlled and this may be accomplished by providing separate extruders therefor, and/or flow splitting or controlling means well known in the art.

In addition, more than one pair of male and female closure elements may be simultaneously extruded to contact and adhere with the extruded sheet or film. Further, grasping ridges or ribs, as described in U.S. Pat. No. 4,363,345, may also be simultaneously extruded either from the same die body as that of the closure elements, or they may be extruded separately, and they may be extruded from the same closure melt source or another source. When present, the ridges or ribs may exit the closure profile dies at about the same distance from the casting roll tangency line of the film as do the closure elements. It should be noted, however, that the rib melt streams may swell slightly less than the closure profile streams and therefore preferably may exit their die body closer to the film than the extruded closure elements. Still further, the slot extrusion die may be contoured to provide increased film thickness in the area(s) corresponding to the closure element(s) and/or rib(s)/ridge(s). Such additional film thickness may provide enhanced end-use characteristics to the final container product. For example, such contouring may enhance container quality, especially for container cold temperature use reliability and also improve perceived quality by stiffening the top of the container. Where grasping ridges and/or contoured film thickness areas are prepared pursuant to the general concept of this invention, additional preferential cooling may be provided therefor in accordance with the system(s) employed herein. Further still, the slot extrusion die and system may be substituted for with an annular film extrusion system.

The resulting integral interlocking closure film stock material may be further processed in an apparatus for forming individual reclosable containers. Since the integral interlocking closure film stock material comprises an integral closure web extruded in continuous form so as to provide coextensive sidewall portions of a container, and also provides reclosable closure elements having complementary profile portions, the stock material may be transversely sever-sealed at any desired spaced interval or length to form reclosable containers having various sizes.

Having described the invention, it is contemplated that modifications thereof may be made and that some features may be employed without others, all within the spirit and scope of the invention. However, it is not desired to be limited to the illustrative embodiments for obvious modifications will occur to a person skilled in the art.

What is claimed is:

1. A method of forming integral interlocking closure film stock material comprising feeding a supply of molten thermoplastic material to a film slot extrusion die, extruding a film of said thermoplastic material from an exit face of said extrusion die onto a rotating casting roll, feeding a supply of molten thermoplastic material to interlocking closure profile dies wherein the exit of said profile dies is located between about one inch and about five inches after the exit of said slot extrusion die, extruding said molten thermoplastic material from said profile dies so that the formed closure profiles contact and adhere to said film to form an integral closure web at a location between about one inch to about five inches prior to the tangency line of said web with the periphery of said casting roll, partially cooling said closure profiles by directing a controlled flow of liquid coolant onto the surface of said closure profiles to stabilize the shape of said closure profiles, impinging a flow of gaseous coolant on the film portion of said web at approximately the tangency line of said web and the periphery of said casting roll, and further cooling said closure profiles by passing said closure profiles through secondary cooling nozzle assemblies feeding a controlled stream of liquid coolant directly onto said closure profiles.

2. A method in accordance with claim 1 including providing stripping means to remove liquid coolant from said integral closure web in a zone downstream from said secondary cooling nozzle assemblies.

3. A method in accordance with claim 2 wherein said stripping means comprise one or more liquid coolant suction nozzles and gaseous nozzles.

4. A method in accordance with claim 3 including passing said integral closure web over one or more cooling rolls.

5. A method in accordance with claim 4 wherein said cooling rolls comprise one or more chill rolls.

6. A method in accordance with claim 4 including folding said integral closure web.

7. A method in accordance with claim 1 wherein said film slot extrusion die is contoured to provide increased film thickness in the area corresponding to said closure profiles.

8. A method in accordance with claim 1 including positioning said slot extrusion die and said casting roll so that said film exiting from said slot extrusion die is tangent with the periphery of said casting roll at a distance between about three inches and about eight inches after the exit of said slot extrusion die.

9. A method in accordance with claim 1 including positioning said slot extrusion die and said casting roll so that said film exiting from said slot extrusion die is tangent with the periphery of said casting roll at a distance between about one inch and about five inches after the exits of said closure profile dies.

10. A method in accordance with claim 1 including partially cooling said closure profiles by positioning primary liquid coolant nozzles such that coolant first contacts said closure profiles anywhere within the region between the exits of said closure profile dies and the tangency line of said web with the periphery of said casting roll.

11. A method in accordance with claim 10 including positioning said primary liquid coolant nozzles by means of positioners to avoid damaging said formed closure profiles by said flow of liquid coolant.

12. A method in accordance with claim 1 including positioning an air knife opposite from and facing said casting roll at about the tangency line of said film and the periphery of said casting roll to impinge said gaseous coolant on said film.

13. A method in accordance with claim 12 wherein said air knife is configured with either internal or external diversions to flow gaseous coolant away from the areas corresponding to said formed closure profiles.

14. A method in accordance with claim 12 wherein said air knife is positioned so that the direction of the gaseous coolant stream from said air knife is at an angle of between about 5 degrees and about 60 degrees downward from the horizontal plane.

15. A method in accordance with claim 1 wherein said secondary cooling nozzle assemblies comprise portions having one or more openings therein for passage of liquid coolant to said closure profiles.

16. A method in accordance with claim 15 wherein each of said secondary cooling nozzle assemblies have at least one coolant confining region therein to accommodate passage therethrough of each of said closure profiles.

17. A method in accordance with claim 1 wherein the exit of said closure profile dies is located generally equidistant from said slot extrusion die exit face and the tangency line of said integral closure web on the periphery of said casting roll.

18. A method in accordance with claim 1 including providing said casting roll with means for rotating said casting roll at a controlled rate of rotation.

19. A method in accordance with claim 1 including degassing said liquid coolant.

20. A method in accordance with claim 1 including providing said closure profile dies with an adhesion slot to facilitate seam-free adhesion of said formed closure profiles to said film while retaining distortion-free closure profile shapes.

21. A method in accordance with claim 1 including extruding grasping ridges and adhering said ridges to said film.

22. A method in accordance with claim 21 wherein said ridges exit closer to said film than said closure profiles.

23. A method in accordance with claim 21 wherein said ridges exit said profile dies at about the same distance from said tangency line as said closure profiles.

24. An apparatus for producing integral interlocking closure-film stock material comprising a film slot cast extrusion die, a plurality of closure profile dies, and a rotatable casting roll, said closure profile dies being positioned separately from said film extrusion die so that the exits of said profile dies are located closer to the tangency point of said integral closure-film material with said casting roll than the exit of said film extrusion die is located relative to said tangency point, said exits of said profile dies being located between about one inch and about five inches downstream from the exit of said film extrusion die, said rotatable casting roll being positioned downstream of said film extrusion die and said profile dies to receive and cool a film of molten thermoplastic material exiting from said film extrusion die at a distance between about three inches and about eight inches downstream the exit of said film extrusion die and at a distance between about one inch and about five inches downstream the exits of said closure profile dies, primary cooling nozzles for partially cooling said closure profiles wherein said primary cooling nozzles are positioned such that coolant first contacts said closure profiles anywhere within the region between the exits of said closure profile dies and the tangency line of said integral closure-film material with the periphery of said casting roll, an air knife positioned opposite from and facing said casting roll at about the tangency line of said integral closure-film material and the periphery of said casting roll to impinge gaseous coolant on the film portion of said closure-film material, and secondary cooling nozzle assemblies positioned downstream of said air knife for feeding a controlled stream of liquid coolant onto the closure portion of said closure-film material.

25. An apparatus in accordance with claim 24 wherein said air knife is positioned so that the direction of the gaseous coolant stream from said air knife is at an angle of between about 5 degrees and about 60 degrees downward from the horizontal plane.

26. An apparatus in accordance with claim 24 including liquid coolant stripping means downstream from said secondary cooling nozzle assemblies.

27. An apparatus in accordance with claim 26 wherein said liquid coolant stripping means comprise one or more liquid coolant suction nozzles and gaseous nozzles.

28. An apparatus in accordance with claim 24 including one or more cooling rolls downstream of said casting roll.

29. An apparatus in accordance with claim 28 wherein said cooling rolls comprise one or more chill rolls.

30. An apparatus in accordance with claim 28 including a folding device downstream of said cooling rolls.

31. An apparatus in accordance with claim 24 including a positioner for positioning each of said primary cooling nozzles.

32. An apparatus in accordance with claim 24 wherein said secondary cooling nozzle assemblies comprise portions having one or more openings therein for passage of liquid coolant.

33. An apparatus in accordance with claim 32 wherein each of said secondary cooling nozzle assemblies have at least one coolant confining region therein to accommodate passage therethrough of a closure profile.

34. An apparatus in accordance with claim 24 wherein said closure profile dies include an adhesion slot.

35. An apparatus in accordance with claim 24 wherein said slot extrusion die has an elongated opening parallel with and spaced from the periphery of said casting roll.

36. An apparatus in accordance with claim 24 including means for rotating said casting roll at a controlled rate of rotation.

37. An apparatus in accordance with claim 24 wherein said air knife is configured with either internal or external diversions to flow gaseous coolant away from the area corresponding to said formed closure profiles.

* * * * *